UNITED STATES PATENT OFFICE.

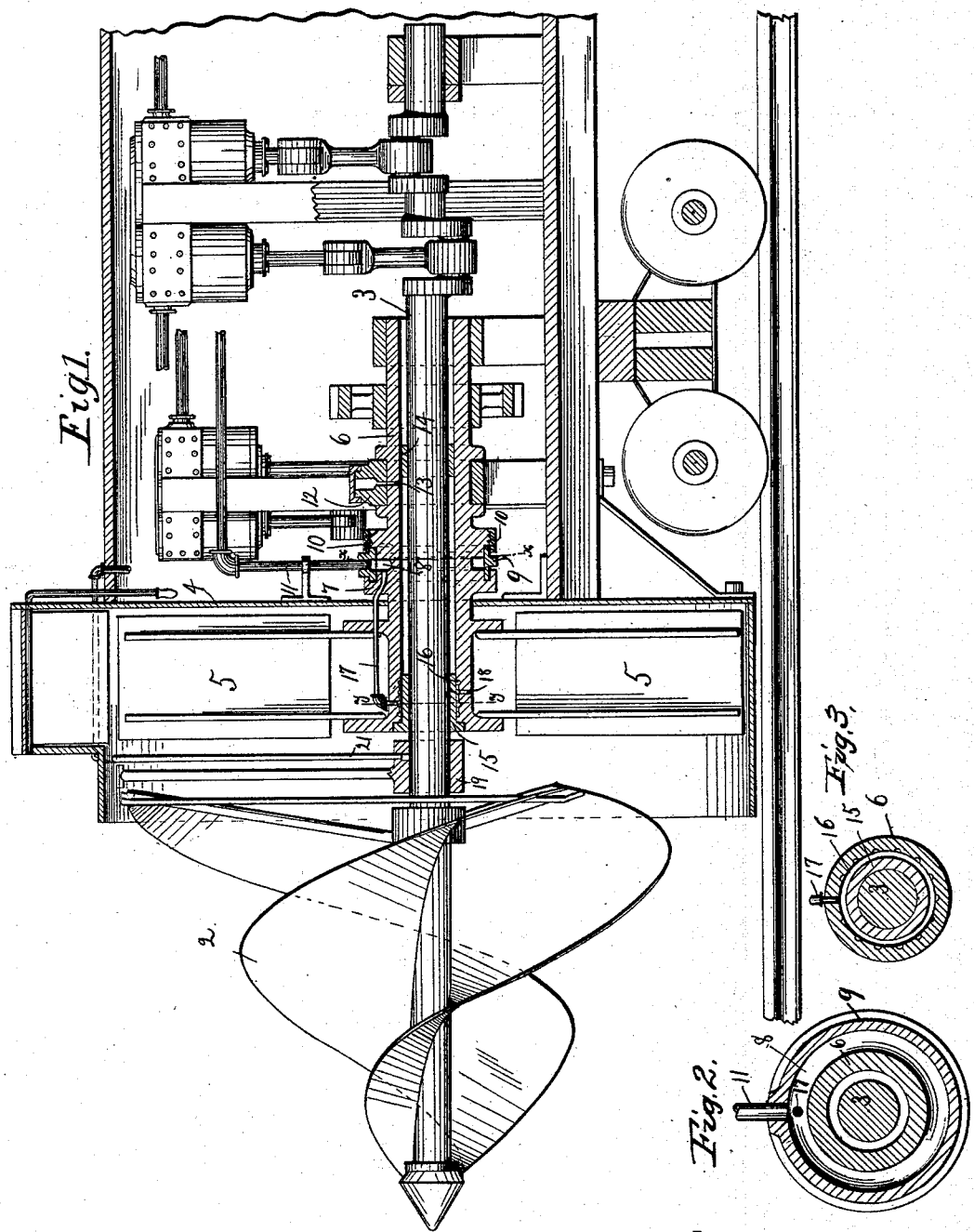

EDWARD P. CALDWELL, OF MINNEAPOLIS, MINNESOTA.

ROTARY SNOW-PLOW.

SPECIFICATION forming part of Letters Patent No. 413,433, dated October 22, 1889.

Application filed May 24, 1889. Serial No. 311,967. (No model.)

*To all whom it may concern:*

Be it known that I, EDWARD P. CALDWELL, of Minneapolis, county of Hennepin, State of Minnesota, have invented certain Improvements in Rotary Snow-Plows, of which the following is a specification.

This invention relates particularly to improvements in that class of snow-plows which is known as "rotary;" and the object I have in view is to provide a rotary plow having an independent fan with means by which snow and ice are prevented from collecting or forming in the space between the cutter-shaft and its forward bearing, and also in the space between the cutter-shaft and the hollow fan-shaft mounted thereon.

This invention is an improvement upon the inventions shown and described in my prior applications for patent, Serial No. 291,235, filed November 19, 1888, and Serial No. 299,370, filed February 11, 1889.

In the accompanying drawings, forming part of this specification, Figure 1 is a longitudinal vertical section of a portion of the snow-plow embodying my invention. Figs. 2 and 3 are details.

In the drawings, 2 represents the cutter, and 3 the cutter-shaft, which is adapted to be driven by any suitable means.

4 represents a suitable fan-casing, which is arranged in the rear of the cutter.

5 represents the fan, which is arranged in the casing 4, and is mounted upon the hollow shaft or sleeve 6, which is arranged upon the cutter-shaft 3. The cutter-shaft and the hollow fan-shaft are arranged to be driven by independent means, which will preferably be arranged as shown in my application, Serial No. 299,370, hereinbefore mentioned. The hollow shaft 6 is preferably provided upon its outer surface with a groove 8, which extends around the shaft. A projecting flange 7 is formed upon the shaft at one side of the groove 8. A flanged ring 9 is arranged upon the shaft and covers the groove 8. One edge of this ring fits under and is held by the flange 7. A threaded ring 10 is screwed upon the shaft at the other side of the ring 9 and engages the other flange of said ring. The flange 7 and the ring 10 form steam-pipe joints with the ring 9. A steam-pipe 11, extending from a suitable steam-supply, communicates through the ring 9 with the groove 8. The rear end of the hollow shaft 6 is supported in a bearing-block 12, which is provided with a suitable oil-receptacle, and the hollow shaft 6 is provided with an opening 13, through which the oil passes from the oil-receptacle into the space between the hollow shaft 6 and the shaft 3. A ring 14 is arranged near the rear end of the shaft 6 in the space between said shaft 6 and the shaft 3, and closes this space back of the oil-opening 13. At the forward end of the shaft 6 is a bushing or sleeve 15, arranged upon the shaft 3 in the space between this shaft and the interior of the hollow shaft 6. A series of connecting grooves 16 extend around the interior of the shaft 6 over the bushing 15. A steam-pipe 17 is connected with the groove 8, passing through the flange 7 upon the hollow shaft 6, and also connects with the grooves 16, passing through the wall of said shaft. Oil is supplied through the opening 13, and the space between the shafts 3 and 6 from the ring 14 to the bushing 15 is kept substantially filled therewith. In order to prevent this oil from becoming stiff from cold and to prevent the ice and snow from working into or ice from forming in the space between these shafts, a supply of steam is fed into the groove 16. This steam passes through the pipe 11, the ring 9 being stationary, into the groove 8. From this groove it passes through the pipe 17 into said groove 16. A drip-port 18 is provided in the hollow shaft 6 opposite the steam-pipe 17. Arranged in front of the fan is a bearing 19, which supports the forward portion of the cutter-shaft 3. This bearing is supported by means of suitable braces from the top of the fan-casing, and a steam-pipe 21 is arranged to enter this bearing and conduct steam into the space between the shaft and the interior of the bearing. The steam supplied to this place keeps the bearing warm and warms the lubricating material therein, and keeps ice and snow out of the bearing, so that the shafts turn freely therein.

The details of construction and arrangement of the devices for conducting the steam to the interior of the hollow shaft may obviously be varied without departing from my invention.

I claim as my invention—

1. The combination, with a rotating shaft provided with a suitable cutter, of a hollow shaft arranged upon said cutter-shaft, a fan upon said hollow shaft, and a steam-pipe connecting with the space between said hollow shaft and said cutter-shaft.

2. The combination, with the cutter-shaft 3, of the hollow fan-shaft arranged upon said cutter-shaft, and the steam-pipe connected with the interior of said hollow shaft at the forward portion thereof.

3. The combination, with the cutter-shaft 3, provided with the bushing 15, of the hollow fan-shaft 6, provided with the grooves 16 on its interior surface over said bushing, and the steam-pipe connecting said grooves, substantially as described.

4. The combination, with the cutter-shaft provided upon its exterior with the circular groove 8, of the stationary ring 9, covering said groove, the steam-pipe 11, connecting with said groove through said ring, and the steam-pipe 17, connecting said groove with the interior of said fan-shaft, substantially as described.

5. The combination, with the cutter-shaft 3, of the hollow fan-shaft mounted upon said cutter-shaft, and the bearing arranged in front of said fan-shaft and supporting said cutter-shaft and provided with a steam-pipe connecting with the space between said bearing and said cutter-shaft, substantially as described.

In testimony whereof I have hereunto set my hand this 26th day of April, 1889.

EDWARD P. CALDWELL.

In presence of—
T. J. COLLBARY,
D. J. SIMS.